United States Patent [19]
Rehrig

[11] 3,837,039
[45] Sept. 24, 1974

[54] COMBINATION THRUST AND RADIAL BEARING

[76] Inventor: Houston Rehrig, 100 Los Altos Dr., Pasadena, Calif. 91105

[22] Filed: Jan. 26, 1973

[21] Appl. No.: 326,895

[52] U.S. Cl............................ 16/20, 16/136, 308/135
[51] Int. Cl........................ B60b 33/00, F16c 17/10
[58] Field of Search............ 16/20, 22, 23; 308/37, 308/135, 238

[56] References Cited
UNITED STATES PATENTS

| | | | |
|---|---|---|---|
| 2,827,303 | 3/1958 | Herbenar | 308/238 X |
| 3,193,335 | 7/1965 | Wing | 308/238 X |
| 3,231,926 | 2/1966 | Stollman | 16/22 |
| 3,380,791 | 4/1968 | Peck | 308/238 X |
| 3,383,143 | 5/1968 | Schmidt | 308/238 X |
| 3,494,676 | 2/1970 | Compton | 308/238 X |
| 3,495,859 | 2/1970 | Hassan | 308/238 X |

Primary Examiner—Paul R. Gilliam
Assistant Examiner—William E. Lyddane

[57] ABSTRACT

A combination thrust and radial bearing including inner and outer housing members. Each housing member includes a longitudinally extending portion and a radially outwardly extending portion. A bearing insert made from synthetic resin is positioned between the housing members and includes a longitudinally extending portion having radially extending ribs thereon, and a radially outwardly extending portion having longitudinally extending ribs thereon. The ribs reduce the contact area, and therefore, the friction between the insert and the adjacent components of the bearing.

10 Claims, 4 Drawing Figures

PATENTED SEP 24 1974 3,837,039

COMBINATION THRUST AND RADIAL BEARING

BACKGROUND OF THE INVENTION

This invention relates to a combination thrust and radial bearing. The bearing is suitable for applications involving relatively low to moderate thrust and radial loading and relatively low rotational speeds, and is especially suitable for use in casters. However, the bearing of the invention is not limited to use in casters and can be employed for other uses in which both thrust and radial bearing functions are required.

The known, relatively inexpensive combination thrust and radial bearings generally comprise either ball bearings or sleeve bearings. Such bearings generally are capable of supporting substantial radial loads but are capable of supporting only very limited thrust loads. Other known combination thrust and radial bearings, and particularly bearings intended for use under adverse conditions, generally require precision machining to very close tolerances in order to obtain a satisfactory service life, and therefore are relatively expensive.

SUMMARY OF THE INVENTION

It is an object of the present invention to provide an improved combination thrust and radial bearing which is relatively simple and inexpensive.

Another object of the invention is to provide a combination thrust and radial bearing which is especially suitable for use in casters.

Basically, the bearing of the invention includes an outer housing member having a longitudinally extending portion and a radially outwardly extending portion at one end thereof, and an inner housing member having a longitudinally extending portion and a radially outwardly extending portion at one end thereof. The inner housing member spacedly and concentrically mates with the outer housing member, and a bearing insert made from synthetic resin and also having a longitudinally extending portion and a radially outwardly extending portion is positioned between the corresponding portions of the housing members. The inner and outer housing members with the bearing insert therebetween are maintained in position by suitable connecting means.

BRIEF DESCRIPTION OF THE DRAWINGS

The invention having been generally described, specific embodiments thereof will be described in detail with reference to the accompanying drawings in which.

DESCRIPTION OF THE PREFERRED EMBODIMENTS

Figure 1:
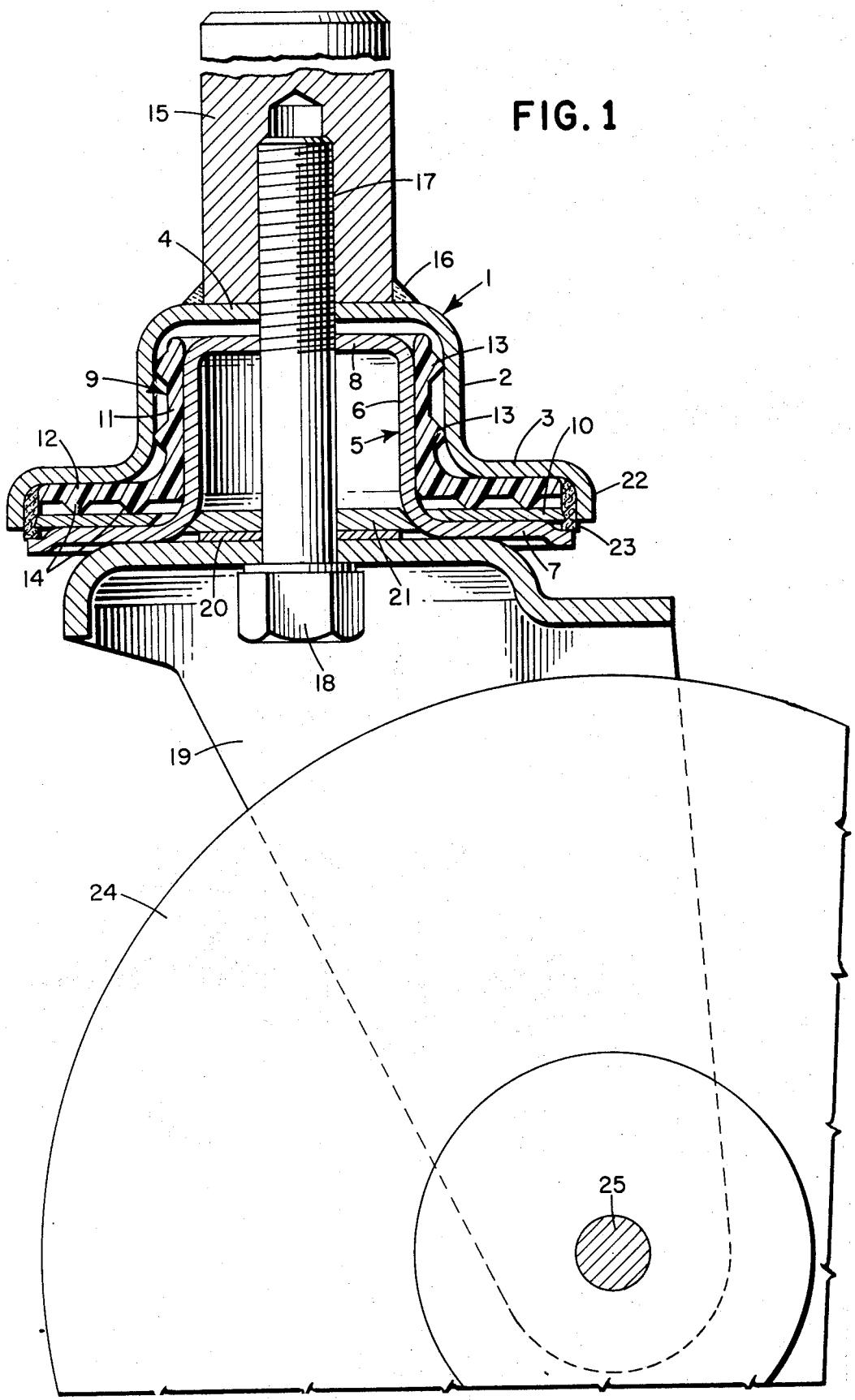
FIG. 1 is a side sectional view of a first embodiment of the bearing of the invention as used in a caster.
Figure 2:
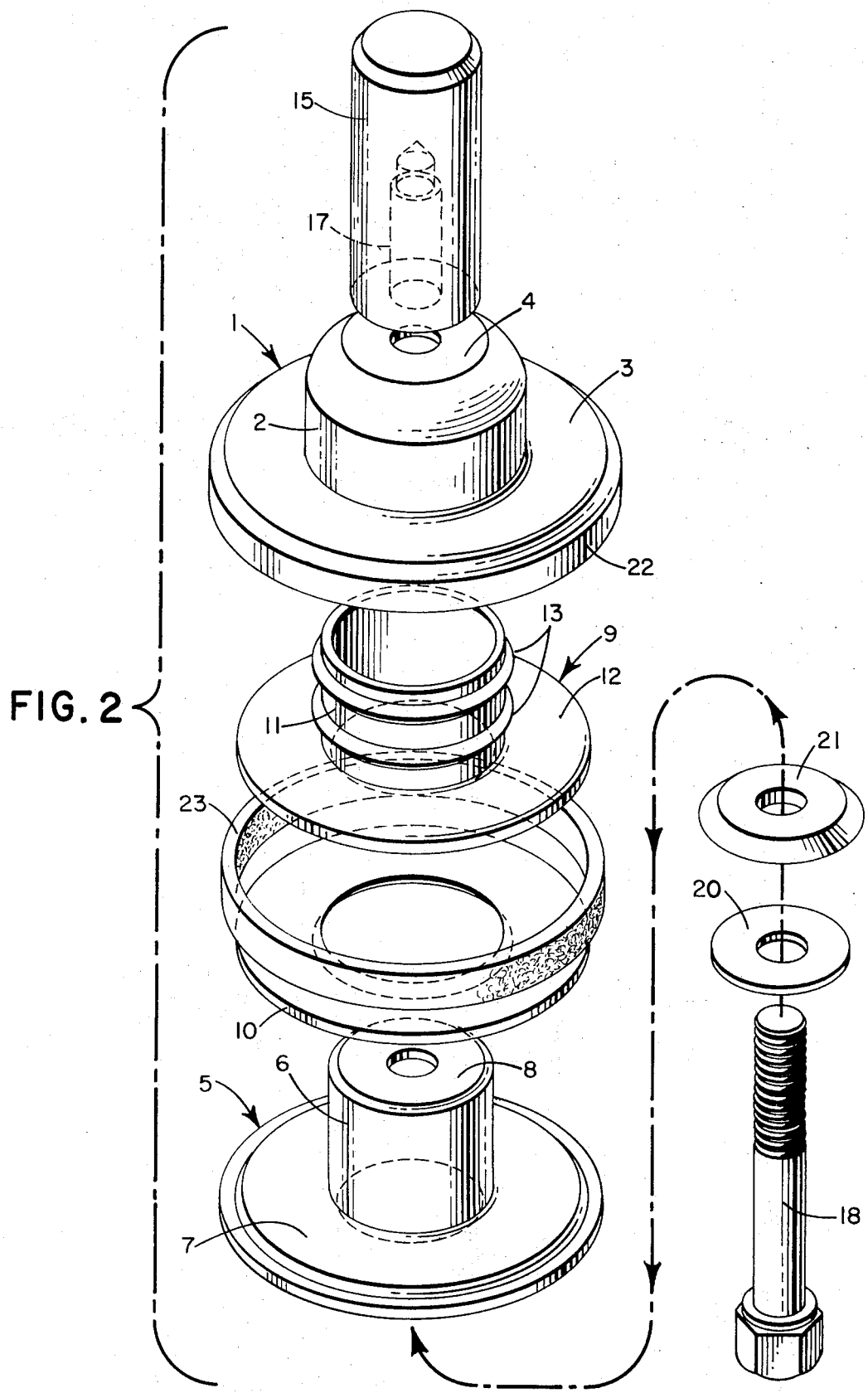
FIG. 2 is an exploded perspective view of the bearing shown in FIG. 1, showing the components thereof.

A first embodiment of the combination thrust and radial bearing of the invention is shown in FIGS. 1 and 2. The bearing includes an outer housing 1 formed generally in a bell-shape and having a longitudinally extending vertical portion 2, a radially outwardly extending portion 3 at the lower end thereof and a radially inwardly extending portion 4 at the upper end thereof. The bearing also includes a similarly configured inner housing member 5 having a longitudinally extending vertical portion 6, a radially outwardly extending portion 7 at the lower thereof and a radially inwardly extending portion 8 at the upper end thereof. Housing members 1 and 5 are positioned concentrically with longitudinally extending portion 6 of member 5 positioned within and spaced from longitudinally extending portion 2 of member 1, and radially extending portions 7 and 8 of member 5 positioned below and spaced from radially extending portions 3 and 4 of member 1, respectively.

A bearing insert 9 and thrust washer 10 are interposed between housing members 1 and 5. Insert 9 is made from synthetic resin, such as tetrafluoroethylene-impregnated nylon, and includes a longitudinally extending vertical portion 11 and a radially outwardly extending portion 12 at the lower end thereof. Insert portions 11 and 12 are formed as an integral one-piece unit and are interposed between the corresponding portions of housing members 1 and 5. Longitudinally extending portion 11 of insert 9 has a smooth inner surface and at least one and conveniently a pair of radially extending ribs 13 formed on the outer surface thereof. The inner surface of insert portion 11 contacts the outer surface of longitudinally extending portion 6 of inner housing member 5, and ribs 13 contact the inner surface of longitudinally extending portion 2 of outer housing member 1. Radially outwardly extending portion 12 of insert 9 has a smooth upper surface and at least one and conveniently a pair of longitudinally extending ribs 14 formed on the lower surface thereof. The upper surface of insert portion 12 contacts the lower surface of radially outwardly extending portion 3 of outer housing member 1, and ribs 14 contact the upper surface of thrust washer 10. The lower surface of washer 10 contacts the upper surface of radially outwardly extending portion 7 of inner housing member 5. By virtue of this construction, as is apparent, all radial and longitudinal thrust loads on the bearing are supported by the respective ribs, thus providing a small area of contact with the adjacent housing and resultant lower torsional friction.

A cylindrical boss 15 is attached to radially inwardly extending portion 4 of outer housing member 1 by a weldment 16. Boss 15 is provided with a tapped hole 17 concentric with the rotational axis of the bearing, and threadably receives a threaded fastener 18. When the bearing is used in a caster, as illustrated in FIG. 1, threaded fastener 18 extends upwardly into boss 15 through a caster wheel fork 19, a spacing washer 20, a centering spacer 21 having a beveled outer edge, radially inwardly extending portion 8 of inner housing member 5, and radially inwardly extending portion 4 of outer housing member 1. Hole 17 is blind-tapped to a predetermined depth such that when fastener 18 is threadably inserted the full depth of the tapped portion and tightened down, the bearing components will be maintained in their proper positions.

A skirt 22 is formed at the periphery of radially outwardly extending portion 3 of outer housing member 1 integral with such portion and extends downwardly therefrom. Skirt 22 partially encloses the bearing components and retains an annular sealing member 23 in position. Sealing member 23 is made from felt or other suitable material and extends between the periphery of the upper surface of radially outwardly extending portion 7 of inner housing member 5 and the inner surface of skirt 22, thus preventing foreign material from entering the bearing.

A caster wheel 24 is rotatably supported on a shaft 25 mounted on fork 19. The upper surface of fork 19 abuts the lower surface of radially outwardly extending portion 7 of inner housing member 5, and spacer 21 keeps such portion centered about the rotational axis of the bearing.

When fork 19 rotates about the axis of the bearing, inner housing member 5 and thrust washer 10 rotate therewith due to the frictional engagement of the fork with the inner housing member and the frictional engagement of the latter with the thrust washer. Since the thrust loading per unit area of insert 9 generally is greater than the radial loading per unit area of the insert, inner housing member 5 and thrust washer 10 generally rotate relative to insert 9, and the latter remains stationary with respect to outer housing member 1. However, should the per unit area radial loading of insert 9 exceed the per unit area thrust loading of the insert, the insert will rotate with inner housing member 5 and thrust washer 10 relative to outer housing member 1. The latter condition may occur, for example, if fork 19 is rotated rapidly while wheel 24 is turning, i.e., the direction of movement of the caster is changed abruptly. However, in either mode of operation, ribs 13 or 14 substantially reduce the contact area, and therefore, the friction between insert 9 and washer 10 or outer housing member 1, respectively.

Figures 3, 4:
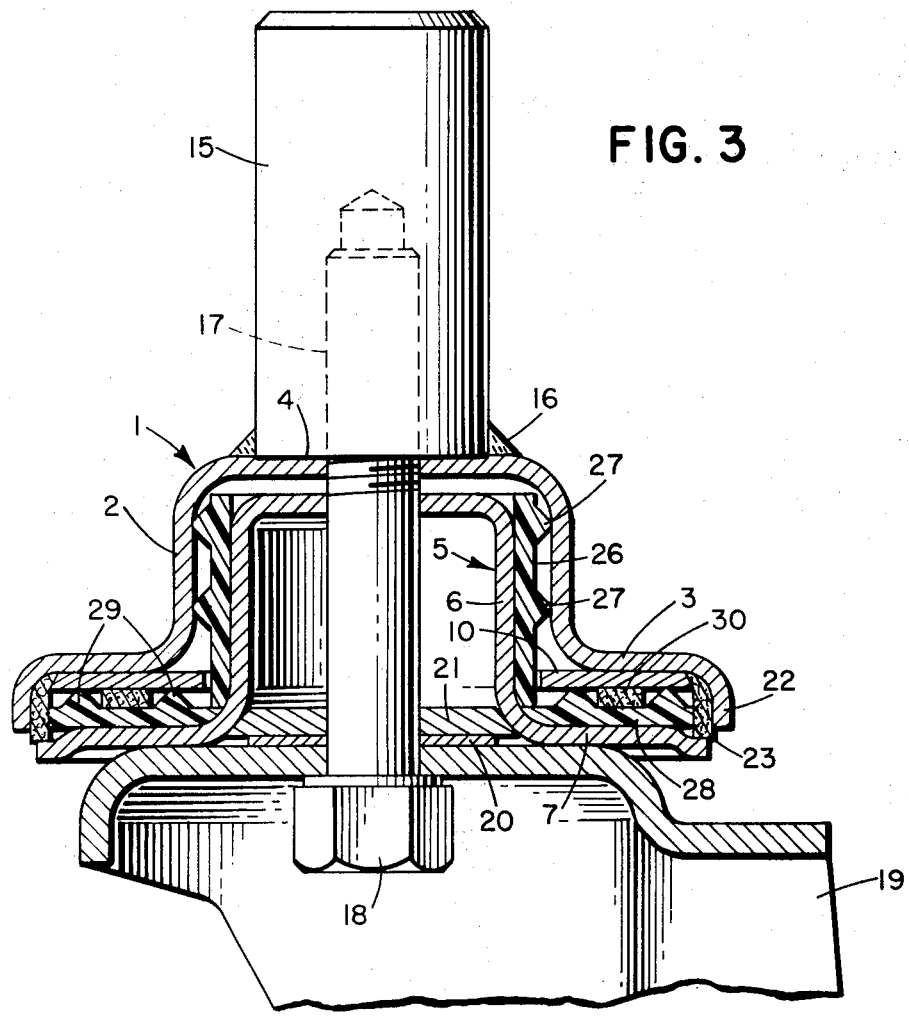
FIG. 3 is a partial side sectional view of a second embodiment of the bearing of the invention also as used in a caster.
FIG. 4 is a perspective view of the components of the bearing insert of the bearing shown in FIG. 3.

A second embodiment of the bearing of the invention is shown in FIGS. 3 and 4. The bearing components of the second embodiment are identical to the components of the first embodiment, with the exception of the synthetic resin bearing insert. Therefore, like components are identified by like reference numerals.

In the embodiment shown in FIGS. 3 and 4, the bearing insert is formed in two pieces. The insert includes a separate longitudinally extending portion 26 having a smooth inner surface and a pair of radially extending ribs 27 formed on the outer surface thereof. The inner surface of insert portion 26 contacts the outer surface of longitudinally extending portion 6 of inner housing member 5, and ribs 27 contact the inner surface of longitudinally extending portion 2 of outer housing member 1. The insert also includes a separate radially outwardly extending portion 28 having a smooth lower surface and a pair of longitudinally extending ribs 29 formed on the upper surface thereof. The lower surface of insert portion 28 contacts the upper surface of radially outwardly extending portion 7 of inner housing member 5, and ribs 29 contact the lower surface of thrust washer 10. The upper surface of washer 10 contacts the lower surface of radially outwardly extending portion 3 of outer housing member 1.

A lubricant-impregnated element 30 may be attached to the lower surface of washer 10 between ribs 29 and extending downwardly into contact with the upper surface of insert portion 28. Element 30 conveniently may be a felt ring impregnated with graphite or grease.

In the embodiment shown in FIGS. 3 and 4, insert portions 26 and 28 will always rotate with inner housing member 5 relative to outer housing member 1 and thrust washer 10 because the areas of the smooth surfaces of the insert portions which contact the inner housing member are much greater than the surface areas of ribs 27 and 29 which contact the outer housing member and thrust washer, respectively.

The two above-described embodiments of the bearing of the invention each has certain unique advantages. The first embodiment, as illustrated in FIGS. 1 and 2, has the advantage of utilizing a bearing insert that may be formed as an integral one-piece unit by known modeling techniques. The second embodiment, as illustrated in FIGS. 3 and 4, while requiring a two-piece bearing insert due to the limitations of known molding techniques, has the advantage that any foreign material which may enter the bearing will tend to fall and remain on the upper surface of insert portion 28 below ribs 29, so that such material will not cause the ribs to wear at their points of contact with thrust washer 10.

While the combination thrust and radial bearing of the invention is described herein for use in a caster, the bearing also is suitable for numerous other uses. Further, since modifications of the bearing of the invention undoubtedly will occur to those skilled in the art, the invention is not limited to the exact structure shown and described herein, but is limited solely by the scope of the appended claims.

I claim:

1. A combination thrust and radial bearing comprising:
    an outer housing member having a first longitudinally extending portion and a first radially outwardly extending portion at one end thereof;
    an inner housing member having a second longitudinally extending portion and a second radially outwardly extending portion at one end thereof, said inner housing member spacedly mating with said outer housing member with said second longitudinally extending portion being positioned concentrically within and spaced from said first longitudinally extending portion and said second radially outwardly extending portion being longitudinally spaced from said first radially outwardly extending portion;
    a bearing insert made from synthetic resin, said insert having a third longitudinally extending portion and a third radially outwardly extending portion, said third longitudinally extending portion being positioned between said first and second longitudinally extending portions and said third radially outwardly extending portion being positioned between said first and second radially outwardly extending portions, with at least one load supporting radially extending circumferential rib formed on one surface of said longitudinally extending portion and at least one load supporting longitudinally extending rib formed on one surface of said third radially outwardly extending portion, such that all thrust and radial loads on said bearing are borne by said ribs; and
    means for maintaining said inner and outer housing members in position with said insert therebetween.

2. The combination thrust and radial bearing according to claim 1, further comprising a thrust washer positioned between said third radially outwardly extending portion and one of said first and second radially outwardly extending portions.

3. The combination thrust and radial bearing according to claim 1, wherein said radially extending circumferential rib is formed on the surface of said third longitudinally extending portion adjacent said first longitudinally extending portion.

4. The combination thrust and radial bearing according to claim 1, wherein said longitudinally extending rib is formed on the surface of said third radially outwardly extending portion adjacent said first radially outwardly extending portion.

5. The combination thrust and radial bearing according to claim 1, wherein said longitudinally extending rib is formed on the surface of said third radially outwardly extending portion adjacent said second radially outwardly extending portion.

6. The combination thrust and radial bearing according to claim 1, further comprising a thrust washer positioned between the surface of said third radially outwardly extending portion having said longitudinally extending rib formed thereon and one of said first and second radially outwardly extending portions.

7. The combination thrust and radial bearing according to claim 1, wherein said third longitudinally extending portion and said third radially outwardly extending portion are formed as an integral one-piece unit.

8. The combination thrust and radial bearing according to claim 1, wherein said third longitudinally extending portion and said third radially outwardly extending portion are formed separately.

9. A caster comprising the combination thrust and radial bearing of claim 1 and further comprising a wheel-carrying member connected to said bearing and a wheel rotatably mounted on said wheel-carrying member.

10. A combination thrust and radial bearing comprising:
an outer housing member having a first longitudinally extending portion and a first radially outwardly extending portion at one end thereof;
an inner housing member having a second longitudinally extending portion and a second radially outwardly extending portion at one end thereof, said inner housing member spacedly mating with said outer housing member with said second longitudinally extending portion being positioned concentrically within and spaced from said first longitudinally extending portion and said second radially outwardly extending portion being longitudinally spaced from said first radially outwardly extending portion;
a bearing insert made from synthetic resin, said insert having a third longitudinally extending portion and a third radially outwardly extending portion, said third longitudinally extending portion being positioned between said first and second longitudinally extending portions and having a plurality of radially extending ribs formed on one surface thereof, and said third radially outwardly extending portion being positioned between said first and second radially outwardly extending portions and having a plurality of longitudinally extending ribs formed on one surface thereof;
a thrust washer positioned between said third radially outwardly extending portion and one of said first and second radially outwardly extending portions; and
means for maintaining said inner and outer housing members in position with said insert therebetween, said maintaining means including, a centering member extending across and positioned at the end of said second longitudinally extending portion adjacent said second radially outwardly extending portion, a fastener receiving means attached to said outer housing member at the end thereof opposite said first radially outwardly extending portion, and a fastener extending through said centering member and received by said receiving means.

* * * * *